UNITED STATES PATENT OFFICE.

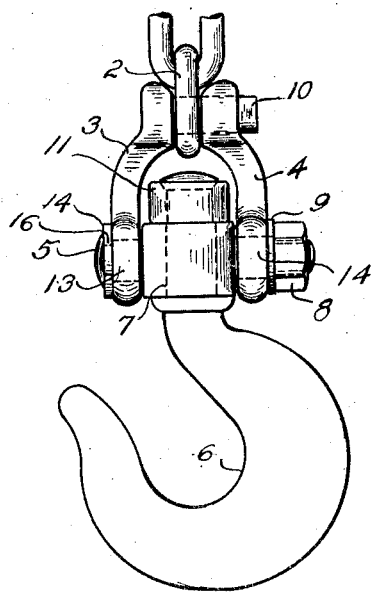
Fig.-1.
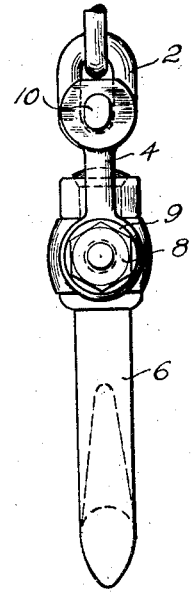
Fig.-2.
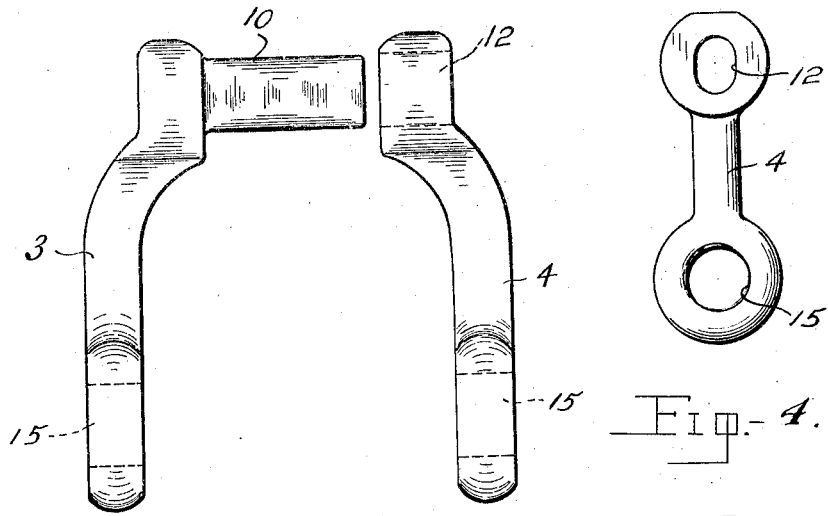
Fig.-3.
Fig.-4.
Inventor
Arthur S. Remsberg
By Bates Macklin
Attorneys

ARTHUR S. REMSBERG, OF LAKEWOOD, OHIO, ASSIGNOR TO THE CHISHOLM-MOORE MANUFACTURING COMPANY, OF CLEVELAND, OHIO, A CORPORATION OF OHIO.

CHAIN-SHACKLE.

1,393,568. Specification of Letters Patent. Patented Oct. 11, 1921.

Application filed October 12, 1920. Serial No. 416,462.

*To all whom it may concern:*

Be it known that I, ARTHUR S. REMSBERG, a citizen of the United States, residing at Lakewood, in the county of Cuyahoga and State of Ohio, have invented a certain new and useful Improvement in Chain-Shackles, of which the following is a full, clear, and exact description, reference being had to the accompanying drawings.

This invention relates to an improvement in clevises such as are used in connecting hooks to hoist chains and cables.

The particular object of my invention is to provide a clevis of sufficient strength and of a minimum number of parts which are of such shape that it may be economically manufactured.

A further purpose of the present invention is to provide a clevis that may be readily connected to a hoisting cable or chain.

The practice heretofore has been to pass a bolt through openings in the clevises and the last link of a hoisting chain or through a loop in a hoisting cable, while in my invention a proper and safe coupling together of the hook and hoisting means may be easily accomplished without the use of a bolt. To attain this object I have arranged the clevis members so that they interengage in such a manner as to eliminate the use of a bolt.

Referring to the drawings Figure 1 is a side elevation of a hook and chain connection embodying my invention, while Fig. 2 is a side elevation showing the relative proportions of the members of the connection or clevis to the chain links. In Fig. 3 I have shown the clevis members as being disengaged, while Fig. 4 is a side elevation of one of the clevis members.

Designating the various parts by numerals, in Fig. 1, I have shown the end link 2 of a hoist chain as being engaged by an extension 10 which protrudes from the clevis member 3 approximately normal to the center line of the hook 6. This extension may have an oblong cross-section corresponding in width to approximately the width of the opening in the chain link and may be adapted to fit an oblong opening 12 in the clevis member 4 which may have a cross-section corresponding to the cross-section of the extension 10. This clevis member may correspond in contour to the member 3 with the exception of the extension 10.

As it is essential that means should be provided to permit free movement of the hook, I have shown a hook swivel 7 with integral studs 13 and 14 arranged coaxially on opposite sides of the swivel, one of which may be longer than the other and threaded to retain a nut as shown at 8.

Located at the lower end of the members 3 and 4 are holes 15 which are arranged to be coaxial when the members are brought together by inserting the extension 10 in the opening 12, and may be of sufficient size to permit a turning movement of the hook swivel 7, when they are assembled on the studs 13 and 14, which are integral with the swivel.

In order to insure a correct assemblage of the parts I have provided an extension 16 of the stud 13, of smaller diameter than the stud, that may be upset to secure the washer 5 upon the stud and which may act to maintain the member 3 loosely upon the hook swivel 7, so that only the clevis member 4 may be removed from the swivel to permit coupling of the hoisting means.

As I have arranged the contour of the members 13 and 14 to clear the hook anchor 11 and permit free movement of the same as the hook is turned about the stud centers or its own center, they must necessarily take the shape of a yoke when assembling, which may be accomplished by passing the extension 10 through the link 2 and then respectively inserting the threaded swivel stud 14 and extension 10 in the openings 15 and 12 of the member 4 and then securing that member by means of the washer 9 and nut 14.

From the foregoing description it is to be seen that I have invented a hook coupling that is composed of a minimum number of parts which are of such shape that they may be accurately manufactured on an economical basis, and, furthermore, by arranging the hook coupling with interengaging clevises, one of which may be removed, I have provided a coupling which may be quickly and securely attached to a hoisting means.

Having thus described my invention, I claim:

1. In a hook coupling, the combination of two interengaging members, one of them having an integral extension passed into an opening in the other, said extension being adapted to be embraced by a chain link intermediate the members, and a hook swivel removably supported by the lower portions of said members.

2. A hook coupling having a pair of interengaging members, one of the members having an elongated opening at its upper end, and the other of said members having an extension corresponding in cross-section to said opening and adapted to fit said opening when said members are assembled.

3. In a hook coupling, a pair of interengaging members, one having a projection and the other an opening through which the projection extends, said projection being adapted to be surrounded by a chain link intermediate the members, a block between the lower portions of the members having trunnions extending into them whereby the block is pivoted thereto, one of said trunnions being screw threaded beyond the corresponding member, a nut on such screw thread, and a hook having its shank swiveled in the block between said members.

4. The combination of a pair of members, one having a rigid projection and the other an opening into which the projection extends, while leaving space between the members to enable the projection to be surrounded by a chain link, and a hook having its shank swivelly supported by the lower portion of said members by means connected with both members, the connection with the last one of the members being removable to enable the separation of the members.

5. In a hook coupling the combination of two interengaging members adapted to support a hook swivel disposed intermediate of their lower ends, and means on said swivel permanently securing one of the members to the swivel and means removably securing the other of said members to the swivel.

6. In a hook coupling, the combination of two interengaging members, one having an extension oblong in cross-section, and approximately normal to the center line of the hook and engaging the other member through an oblong opening and having a chain link disposed intermediate of the two members.

7. A hook coupling, comprising a pair of converging and interengaging members adapted to pivotally support a hook swivel intermediate of their lower portions, one of said members having an integral projection at the upper converging portion thereof, said projection being adapted to engage a chain link disposed intermediate of the converging portions of said interengaging members.

8. A hook coupling comprising a pair of converging and interengaging members adapted to pivotally support a hook swivel intermediate of their lower portions, one of the members being removably secured to said hook swivel, the other of said members having an integral projection at the upper converging portion thereof, said projection loosely engaging a chain link disposed intermediate of the converging portions of said interengaging members, and substantially fill the space of said link.

9. A hook coupling comprising a pair of converging and interengaging members adapted to pivotally support a hook swivel intermediate of their lower portions, one of the members being removably secured to said hook swivel and having an opening located in the upper converging portion thereof, the other of said members having an integral projection at the upper converging portion thereof proportioned so as to substantially fill the opening of a chain link disposed intermediate of the converging portions of said members, and the opening in said converging member.

In testimony whereof, I hereunto affix my signature.

ARTHUR S. REMSBERG.